US012748805B2

(12) United States Patent
Rajabi et al.

(10) Patent No.: US 12,748,805 B2
(45) Date of Patent: Sep. 29, 2026

(54) CONTENT-AWARE ARTIFICIAL INTELLIGENCE GENERATED FRAMES FOR DIGITAL IMAGES

(71) Applicant: Microsoft Technology Licensing, LLC, Redmond, WA (US)

(72) Inventors: Farzaneh Rajabi, San Jose, CA (US); Ji Li, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 273 days.

(21) Appl. No.: 18/395,909

(22) Filed: Dec. 26, 2023

(65) Prior Publication Data

US 2025/0209272 A1 Jun. 26, 2025

(51) Int. Cl.

| | |
|---|---|
| ***G06F 40/289*** | (2020.01) |
| ***G06V 10/25*** | (2022.01) |
| ***G06V 10/74*** | (2022.01) |
| ***G06V 20/70*** | (2022.01) |

(52) U.S. Cl.

CPC ............ *G06F 40/289* (2020.01); *G06V 10/25* (2022.01); *G06V 10/761* (2022.01); *G06V 20/70* (2022.01); *G06V 2201/07* (2022.01)

(58) Field of Classification Search

CPC .... G06F 40/289; G06F 16/58; G06F 16/5866; G06F 40/30; G06F 16/54; G06V 10/25; G06V 10/761; G06V 20/70; G06V 2201/07; G06T 11/60

See application file for complete search history.

(56) References Cited

U.S. PATENT DOCUMENTS

| | | | | |
|---|---|---|---|---|
| 2017/0185236 | A1 | 6/2017 | Yang | |
| 2021/0224315 | A1* | 7/2021 | Wu | G06F 16/5838 |
| 2022/0067991 | A1 | 3/2022 | Raviv | |
| 2022/0414142 | A1 | 12/2022 | Chang | |
| 2023/0325991 | A1 | 10/2023 | Lin | |

(Continued)

OTHER PUBLICATIONS

International Search Report and Written Opinion received for PCT Application No. PCT/US2024/055296, Mar. 3, 2025, 14 pages.

(Continued)

*Primary Examiner* — Oneal R Mistry
*Assistant Examiner* — Justin Philip Cascais
(74) *Attorney, Agent, or Firm* — NovoTechIP International PLLC

(57) ABSTRACT

A data processing system implements receiving an image and a natural language prompt input by a user requesting that an application generate an digital picture frame for the image; analyzing the prompt using a key-phrase extraction unit to extract one or more key phrases from the prompt that describe a topic of the frame to be generated for the image; providing the one or more key phrases as an input to a retrieval engine; analyzing the one or more key phrases with the retrieval engine to identify a set of candidate frame images from among a plurality of frame images in a labeled frame images datastore; analyzing the set of candidate frame images using an image placement unit to obtain a set of framed images based on the image and the candidate frame images; and presenting the set of framed images on a user interface of the application.

19 Claims, 10 Drawing Sheets

(56) References Cited

U.S. PATENT DOCUMENTS

| | | | | |
|---|---|---|---|---|
| 2024/0127511 | A1* | 4/2024 | Brdiczka | G06T 11/60 |
| 2025/0131623 | A1* | 4/2025 | Boyd | G06N 3/0895 |

OTHER PUBLICATIONS

Zhao, et al., "Compositing-Aware Image Search", Proceedings of the European Conference on Computer Vision (ECCV), 2018, 16 pages.

International Preliminary Report on Patentability (Chapter I) Received for PCT Application No. PCT/US2024/055296, Jul. 9, 2026, 08 pages.

* cited by examiner

CONTENT-AWARE ARTIFICIAL INTELLIGENCE GENERATED FRAMES FOR DIGITAL IMAGES

BACKGROUND

Design applications provide users with the ability to create professional quality content graphics, illustrations, and other content, such as but not limited to social media posts, invitations, graphics, posters, advertisements, and/or other content. Many of these design applications allow users to upload digital images and to select a frame into which the digital image may be incorporated. The frames can be used to improve the look and feel of the social media posts, invitations, graphics, posters, advertisements, and/or other content authored by the user. The frames that are available may be selected from a set of pre-generated frames and/or generated using an artificial intelligence (AI) model. Current designer applications struggle to automatically identify a frame and/or generate a frame that is both contextually relevant and seamlessly integrates with the digital image that has been uploaded. Hence, there is a need for improved systems and methods that provide means for automatically generating contextually relevant and seamlessly integrated frames for digital images.

SUMMARY

An example data processing system according to the disclosure includes a processor and a memory storing executable instructions. The instructions when executed cause the processor alone or in combination with other processors to perform operations including receiving an electronic copy of an image from an application; receiving a natural language prompt input by a user of the application requesting that the application generate an digital picture frame for the image, the natural language prompt including a description of the frame to be created for the image; analyzing the natural language prompt using a key-phrase extraction unit to extract one or more key phrases from the natural language prompt that describe a topic of the frame to be generated for the image; providing the one or more key phrases as an input to a retrieval engine; analyzing the one or more key phrases with the retrieval engine to identify a set of candidate frame images from among a plurality of frame images in a labeled frame images datastore; analyzing the set of candidate frame images using an image placement unit to obtain a set of framed images based on the image and the candidate frame images; and presenting the set of framed images on a user interface of the application.

An example method implemented in a data processing system includes receiving an electronic copy of an image from an application; receiving a natural language prompt input by a user of the application requesting that the application generate an digital picture frame for the image, the natural language prompt including a description of the frame to be created for the image; analyzing the natural language prompt using a key-phrase extraction unit to extract one or more key phrases from the natural language prompt that describe a topic of the frame to be generated for the image; providing the one or more key phrases as an input to a retrieval engine; analyzing the one or more key phrases with the retrieval engine to identify a set of candidate frame images from among a plurality of frame images in a labeled frame images datastore; analyzing the set of candidate frame images using an image placement unit to obtain a set of framed images based on the image and the candidate frame images; and presenting the set of framed images on a user interface of the application.

An example data processing system according to the disclosure includes a processor and a memory storing executable instructions. The instructions when executed cause the processor alone or in combination with other processors to perform operations including receiving an electronic copy of an image from an application; receiving a natural language prompt input by a user of the application requesting that the application generate an digital picture frame for the image, the natural language prompt including a description of the frame to be created for the image; analyzing the natural language prompt using a key-phrase extraction unit to extract one or more key phrases from the natural language prompt that describe a topic of the frame to be generated for the image; selecting a prompt from among a plurality of prompts of a pre-generated prompt datastore based on the one or more key phrases; providing the prompt to a text-to-image generative language model to cause the text-to-image generative language model to generate a set of candidate frame images; analyzing the set of candidate frame images using an image placement unit to obtain a set of framed images based on the image and the candidate frame images; and presenting the set of framed images on a user interface of the application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
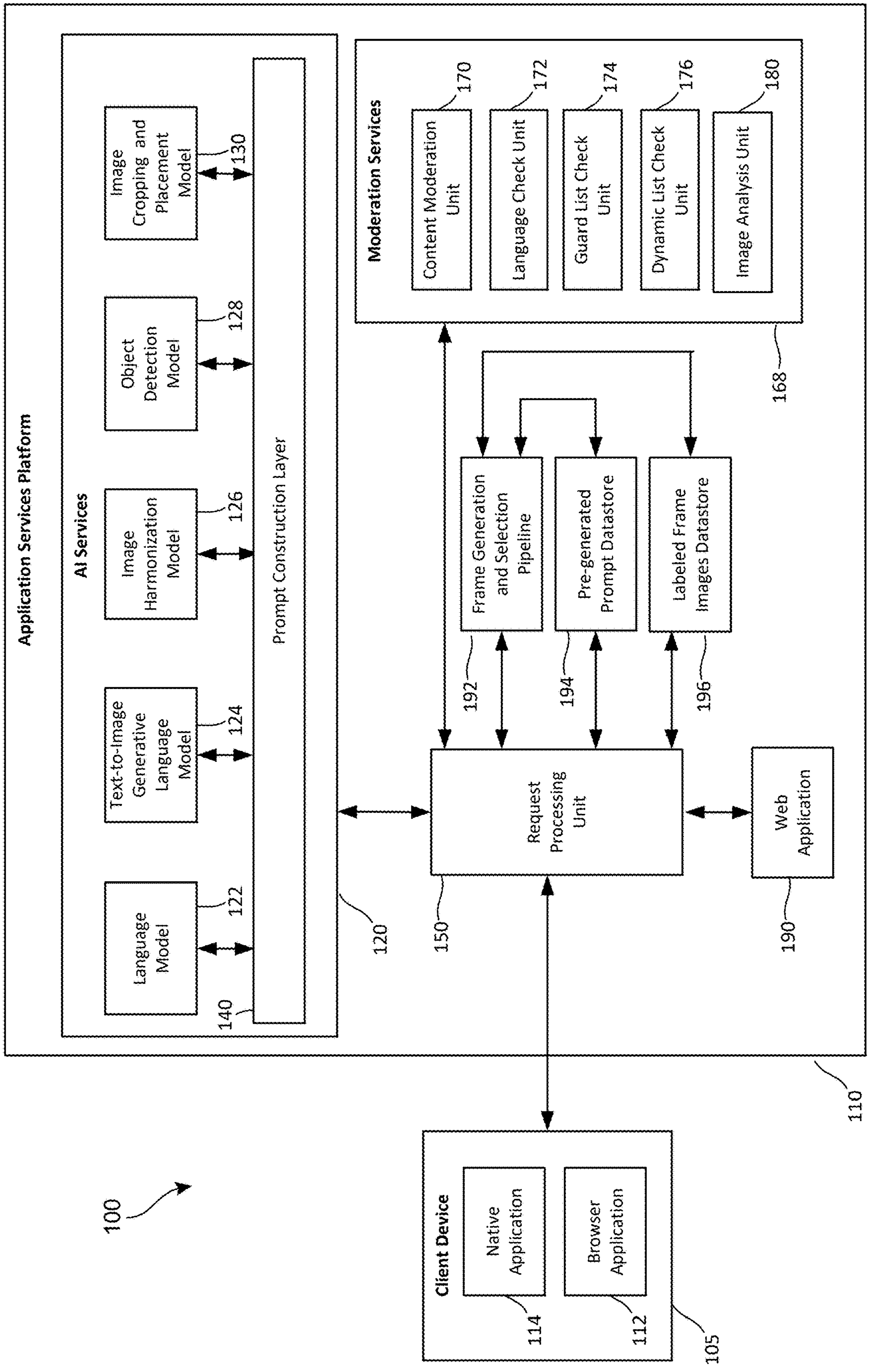
FIG. 1 is a diagram of an example computing environment in which the techniques for automatically generating contextually relevant and seamlessly integrated framed digital images described herein are implemented.

Systems and methods for automatically generating contextually relevant and seamlessly integrated frames for digital images are described herein. These techniques utilize AI to provide context-sensitive selection and/or creation of digital frames for digital images. The techniques herein also utilize AI to provide content-sensitive layout of the digital images in the frames. Each frame includes one or more spaces into which a respective digital image can be added. The frames can be used to improve the look and feel of the social media posts, invitations, graphics, posters, advertisements, and/or other content authored by the user by providing contextually relevant borders around the digital images. The frames are generated using a text-to-image generative language model. The text-to-image generative language model may be implemented by various Large Language Models (LLMs), such as but not limited to DALL-and other such LLMs that are trained to generate image content based on a natural language prompt describing the content to be generated. Current designer applications lack the capability to provide such contextually relevant frames for digital images. The techniques herein provide a pipeline architecture for generating, storing, and selecting context-sensitive frames for digital images. In some implementations, a set of image frames are generated using a set of natural language prompts from a prompt datastore. The set of natural language prompts have been constructed to cause the text-to-image generative language model to generate one or more image frames that are associated with a specific topic or topics. Each topic can represent an occasion, holiday, a sporting event, a life event, a famous landmark, historical event, and/or other such topics for which user may wish to obtain a contextually relevant frame for a digital image. The image frames generated by the text-to-image generative language model are then labeled to indicate that the image frames are associated with the specific topic or topics and stored in a labeled frame images datastore. A technical benefit of this approach is that the providers of the design application can carefully construct customized well-engineered prompts that are tailored for creating image frames for various topics, which improves the contextual relevance of the frames generated by the text-to-image generative language model compared with generating the image frames based on a natural language prompt input by the user. The natural language prompt input by the user is not customized for the particular intricacies of the text-to-image generative language model being used to generate the image frames and often result in less precise results from the generative model. The pipeline architecture disclosed herein provides an interface for receiving a digital image and a natural language prompt from a user. The digital image is the image for which a frame is to be created, and the natural language prompt describes the topic for the frame and/or the other attributes of the image frame to be incorporated with the digital image. These techniques implement a retrieval and ranking unit that analyzes the natural language prompt to extract one or more key phrases from the natural language prompt and search for frame images in the labeled frame images datastore that are most relevant to these key phrases.

These techniques also implement an image placement unit that places the digital image in the frame images that were identified by the retrieval and ranking unit. The image placement unit utilizes one or more machine learning models trained to recognize objects in the digital image, crop the digital image to fit each of the frame images that were identified to include the recognized objects, and to harmonize the lighting, colors, and/or other attributes of the digital image and each respective image frame to provide a well-integrated and contextually-relevant set of framed images that are presented to the user. A technical benefit of this approach is that presenting the user with contextually relevant and well-integrated framed images not only improves the user experience but also reduces the computing resources consumed because users are less likely to regenerate the image frames repeatedly to obtain an image frame that satisfies their requirements.

Some implementations of the pipeline architecture do not generate the labeled frame images datastore in advance as discussed above. Instead, such implementations of the pipeline architecture analyze the natural language prompt input by the user with a key-phrase extraction unit to extract one or more key phrases from the natural language prompt that identify a topic of the digital image and utilize a prompt selection unit to select a prompt from the prompt datastore based on the one or more key phrases. The selected prompt is then provided to the text-to-image generative language model to generate a set of one or more image frames. The image placement unit is then used to place the image in the set of one or more image frames as discussed above and the results are presented to the user. Both the first and second architectures may be utilized in some implementations and new frame images are generated in response to the user prompt in instances in which the user has requested an image frame for a topic for which no pre-generated frame images were available. A technical benefit of this approach is that the pipeline architecture automatically extends to include additional topics for which pre-generated prompts have not already been constructed, thereby allowing the system to automatically adapt to the needs of the user. An administrator or other authorized user can construct pre-generated prompts for these topics and add these prompts to the system in response to user demand. These and other technical benefits of the techniques disclosed herein will be evident from the discussion of the example implementations that follow.

FIG. 1 is a diagram of an example computing environment 100 in which the techniques described herein are implemented. The example computing environment 100 includes a client device 105 and an application services platform 110. The application services platform 110 provides one or more cloud-based applications and/or provides services to support one or more web-enabled native applications on the client device 105. These applications may include but are not limited to design applications, communications platforms, visualization tools, and collaboration tools for collaboratively creating visual representations of information, and other applications for consuming and/or creating electronic content. The client device 105 and the application services platform 110 communicate with each other over a network (not shown). The network may be a combination of one or more public and/or private networks and may be implemented at least in part by the Internet.

The application services platform 110 includes a request processing unit 150, artificial intelligence (AI) services 120, moderation services 168, a web application 190, a frame generation and selection pipeline 192, a pre-generated prompt datastore 194, and labeled frame images datastore 196. The request processing unit 150 is configured to receive requests from a design application implemented by the native application 114 of the client device 105 and/or the web application 190 of the application services platform 110. The requests may include but are not limited to requests to generate new content for a design, to generate a frame for a user-specified image, and/or perform other actions as discussed in the examples which follow. A design, as used herein, refers to electronic content, such as but not limited to web pages, blogs, social media posts, invitations, graphics, posters, and/or advertisements. The design can include textual content, images, and/or illustrations, and the design application can use AI to assist with the creation and/or customization of this content. The design application also utilizes AI to generate image frames, select from among pre-generated images frames, and/or harmonize the attributes of the digital image and/or the frame image with which the digital image is to be integrated. In some implementations, the web application 190 of the application services platform 110 implements this functionality of the design application. In other implementations, at least a portion of this functionality is implemented by the native application 114 of the client device 105. The request processing unit 150 also coordinates communication and exchange of data among components of the application services platform 110 as discussed in the examples which follow.

The frame generation and selection pipeline 192 is a pipeline architecture that analyzes a user-specified image and natural language and generates one or more framed versions of the digital image. The frame generation and selection pipeline 192 utilizes models of the AI services 120 to generate, select, and/or format the frame images. Additional details of the frame generation and selection pipeline 192 are shown in the example implementations shown in FIGS. 2 and 3.

The pre-generated prompt datastore 194 is a persistent datastore in a memory of the application services platform 110. The pre-generated prompt datastore 194 includes set of natural language prompts have been constructed to cause the text-to-image generative language model to generate one or more image frames that are associated with a specific topic or topics. Each topic can represent an occasion, holiday, a sporting event, a life event, a famous landmark, historical event, and/or other such topics for which user may wish to obtain a contextually relevant frame for a digital image. The specific topics included in the pre-generated prompt datastore 194 may vary in different implementations. Furthermore, an administrator or other authorized user may construct new prompts to add to the pre-generated prompt datastore 194, and/or remove or modify existing prompts.

The labeled frame images datastore 196 includes a set of pre-generated image frames that have been generated using prompts from the pre-generated prompt datastore 194. Each frame image is labeled with the specific topic or topics associated with the prompt used to generate the frame image. The frame generation and selection pipeline 192 selects from among the image frames in the labeled frame images datastore 196 to create framed images instances.

The AI services 120 provide various machine learning models that analyze and/or generate content for the labeled frame images datastore 196 and/or other components of the application services platform 110. The AI services 120 include a language model 122, a text-to-image generative language model 124, an image harmonization model 126, an object detection model 128, and an image cropping and placement model 130 in the example implementation shown in FIG. 1. Other implementations may include additional models and/or a different combination of models to provide services to the various components of the application services platform 110.

The language model 122 is a machine learning model trained to generate textual content in response to natural language prompts input by a user via the native application 114 or via the browser application 112. The language model 122 is implemented using a large language model (LLM) in some implementations. Examples of such models include but are not limited to a Generative Pre-trained Transformer 3 (GPT-3), or GPT-4 model. The language model 122 is implemented using GPT-4 with Vision (GPT-4V). GPT-4V can receive images as an input and answer questions about those images. Other implementations may utilize other models or other generative models to generate textual content in response to user prompts. The language model 122 is used to generate content to be included in designs created using the design application implemented by the application services platform 110. The language model 122 is also used to generate prompts to other generative models of the AI services 120 to cause the models to generate and/or modify various types of content.

The text-to-image generative language model 124 is a generative model that generates images based on textual natural language prompts describing the imagery to be generated. In some implementations, the text-to-image generative language model 124 is a multimodal model that can also receive a sample image as an input and customize the image that is output based on both the natural language prompt and the sample image. The frame generation and selection pipeline 192 uses the text-to-image generative language model 124 to generate image frames in response to user prompts and/or to generate the image frames included in the pre-generated prompt datastore 194.

The image harmonization model 126 is a machine learning model that is configured to receive a framed image that comprises an image that is placed in an image frame and harmonize the lighting, colors, and/or other attributes of the digital image and the image frame to provide a well-integrated and contextually relevant framed images. The image harmonization model 126 is implemented with a Parametric Image Harmonization (PIH) which harmonizes the attributes of composite images. Other types of harmonization models can also be used. In some implementations, the image and the image frame are provided as separate inputs to the image harmonization model 126 and the image harmonization model 126 harmonizes the attributes of the image and the image frame and outputs the harmonized image and image frame.

The object detection model 128 is a machine learning model that identifies the location of objects in an image and outputs a bounding box that identifies the location of the object. The frame generation and selection pipeline 192 uses the object detection model 128 to identify the location of a space in the image frame into which an image may be placed. This space may be square or rectangular. Other shapes, such as circular or ovular shaped spaces for inserting images may also be supported and the model outputs bounding shape information rather than a bounding box. The frame generation and selection pipeline 192 uses the object detection model 128 to detect objects in the user-specified images as well in some implementations to ensure that the subject of the photo is not cropped should an image be cropped to better fit the image frame. The object detection model 128 is implemented using a You Only Look Once (YOLO) model in some implementations. A technical benefit of this approach is that YOLO models provide fast and accurate object detection, which enables the frame generation and selection pipeline 192 to quickly respond to user requests to selection and/or generate an image frame or frames for a user-specified image.

The image cropping and placement model 130 seamlessly integrates the user-specified image with an image frame. The image cropping and placement model 130 receives the user-specified image and an image frame as an input. The image frame may be selected from the labeled frame images datastore 196 or generated by the frame generation and selection pipeline 192. The image cropping and placement model 130 also receives the bounding box or bounding shape information for the frame that is output by the object detection model 128. The image cropping and placement model 130 may also optionally receive the bounding box information or bounding shape information for the one or more objects detected in the user-specified image. The image cropping and placement model 130 uses the bounding box or bounding shape information for the image frame to determine the shape and size of the space available in the frame to insert the user-specified image. The image cropping and placement model 130 can crop and/or resize the user-specified image if the model determines that the user-specified image needs to be cropped and/or resized to fit within the space available on the image frame. The image cropping and placement model 130 can also utilize the bounding box or bounding shape information for the user-specified image to ensure that the subject matter of the photo is not cropped if the user-specified image is cropped to fit within the image frame. In a non-limiting example, the image cropping and placement model 130 determines that the aspect ratio of the image does not match the aspect ratio of the space available in the frame image and crops and/or resizes the user-specified image. The image cropping and placement model 130 places the cropped and/or resized image into the image frame and outputs a framed image. The framed image can then be provided to the image harmonization model 126.

The prompt construction layer 140 implements prompt adaptation for the various models implemented by the AI services 120. The prompt construction layer 140 can adapt the natural language prompts input by users to a format that is recognized by each of the models to be invoked in response to a particular natural language prompt. The prompt construction layer 140 can also submit pre-generated prompts from the pre-generated prompt datastore 194 to the text-to-image generative language model 124 and/or other models implemented by the AI services 120. In some implementations, the prompt construction layer 140 accesses a model-specific prompt template for each of the models of the AI services 120 from the pre-generated prompt datastore and uses the template to generate a model-specific prompt for each model.

The moderation services 168 analyze natural language prompts input by the user in the design application implemented by the native application 114 and/or the web application 190 and content generated by the language model 122 and/or other models of the AI services 120 to ensure that potentially objectionable or offensive content is not generated or utilized by the application services platform 110. The moderation services 168 also analyze the user-specified images to ensure that the user has not provided an image that includes potentially objectionable or offensive content. If potentially objectionable or offensive content is detected, the moderation services 168 provides a blocked content notification to the client device 105 indicating that the natural language prompt, the user-specified image, and/or the content generated by the AI services 120 in response to the natural language prompt included content that is blocked.

The moderation services 168 performs several types of checks on the natural language prompts entered by the user in the native application 114 or the web application 190 and/or content generated by the language model 122 and/or other models of the AI services 120. The content moderation unit 170 is implemented by a machine learning model trained to analyze the textual content of these various inputs to perform a semantic analysis on the textual content to predict whether the content includes potentially objectionable or offensive content. The language check unit 172 performs another check on the textual content using a second model configured to analyze the words and/or phrase used in textual content to identify potentially offensive language. The guard list check unit 174 is configured to compare the language used in the textual content with a list of prohibited terms including known offensive words and/or phrases. The dynamic list check unit 176 provides a dynamic list that can be quickly updated by administrators to add additional prohibited words and/or phrases. The dynamic list may be updated to address problems such as words or phrases becoming offensive that were not previously deemed to be offensive. The words and/or phrases added to the dynamic list may be periodically migrated to the guard list as the guard list is updated. The image analysis unit 180 analyzes the user-specified images as well as the image frames and framed images generated by the frame generation and selection pipeline 192 to ensure that the images do not include potentially objectionable or offensive content. The image analysis unit 180 identifies text included in the user-specified images, the image frames, and the framed images for processing by the content moderation unit 170, the language check unit 172, the guard list check unit 174, and the dynamic list check unit 176 to determine whether the textual content includes any potentially objectionable or offensive content. The image analysis unit 180 also performs object recognition to predict whether the user-specified images, the image frames, and/or the framed images include any potentially objectionable or offensive content. In some implementations, the image analysis unit 180 utilizes the language model 122 to analyze the user-specified images, the image frames, and/or the framed images. In such implementations, the language model 122 is a GPT-4V model or other model that is capable of receiving images as input and analyzes these images. The specific checks performed by the moderation services 168 may vary from implementation to implementation. If one or more of these checks determines that the textual content includes offensive content, the moderation services 168 can notify the application services platform 110 that some action should be taken.

In some implementations, the moderation services 168 generates a blocked content notification, which is provided to the client device 105. The native application 114 or the web application 190 receives the notification and presents a message on a user interface of the design application or other application that submitted the natural language prompt which could not be processed. The user interface provides information indicating why the blocked content notification was issued in some implementations. The user may attempt to refine the natural language prompt to remove the potentially offensive content. A technical benefit of this approach is that the moderation services 168 provides safeguards against both user-created and model-created content to ensure that prohibited offensive or potentially offensive content is not presented to the user in the native application 114 or the web application 190.

The client device 105 is a computing device that may be implemented as a portable electronic device, such as a mobile phone, a tablet computer, a laptop computer, a portable digital assistant device, a portable game console, and/or other such devices in some implementations. The client device 105 may also be implemented in computing devices having other form factors, such as a desktop computer, vehicle onboard computing system, a kiosk, a point-of-sale system, a video game console, and/or other types of computing devices in other implementations. While the example implementation illustrated in FIG. 1 includes a single client device 105, other implementations may include a different number of client devices that utilize services provided by the application services platform 110.

The client device 105 includes a native application 114 and a browser application 112. The native application 114 is a web-enabled native application, in some implementations, implements a design application as discussed above. The browser application 112 can be used for accessing and viewing web-based content provided by the application services platform 110. In such implementations, the application services platform 110 implements one or more web applications, such as the web application 190, that enables users to create content, including creating image frames for user-specified images. The application services platform 110 supports both the native application 114 and a web application 190 in some implementations, and the users may choose which approach best suits their needs.

Figure 2:
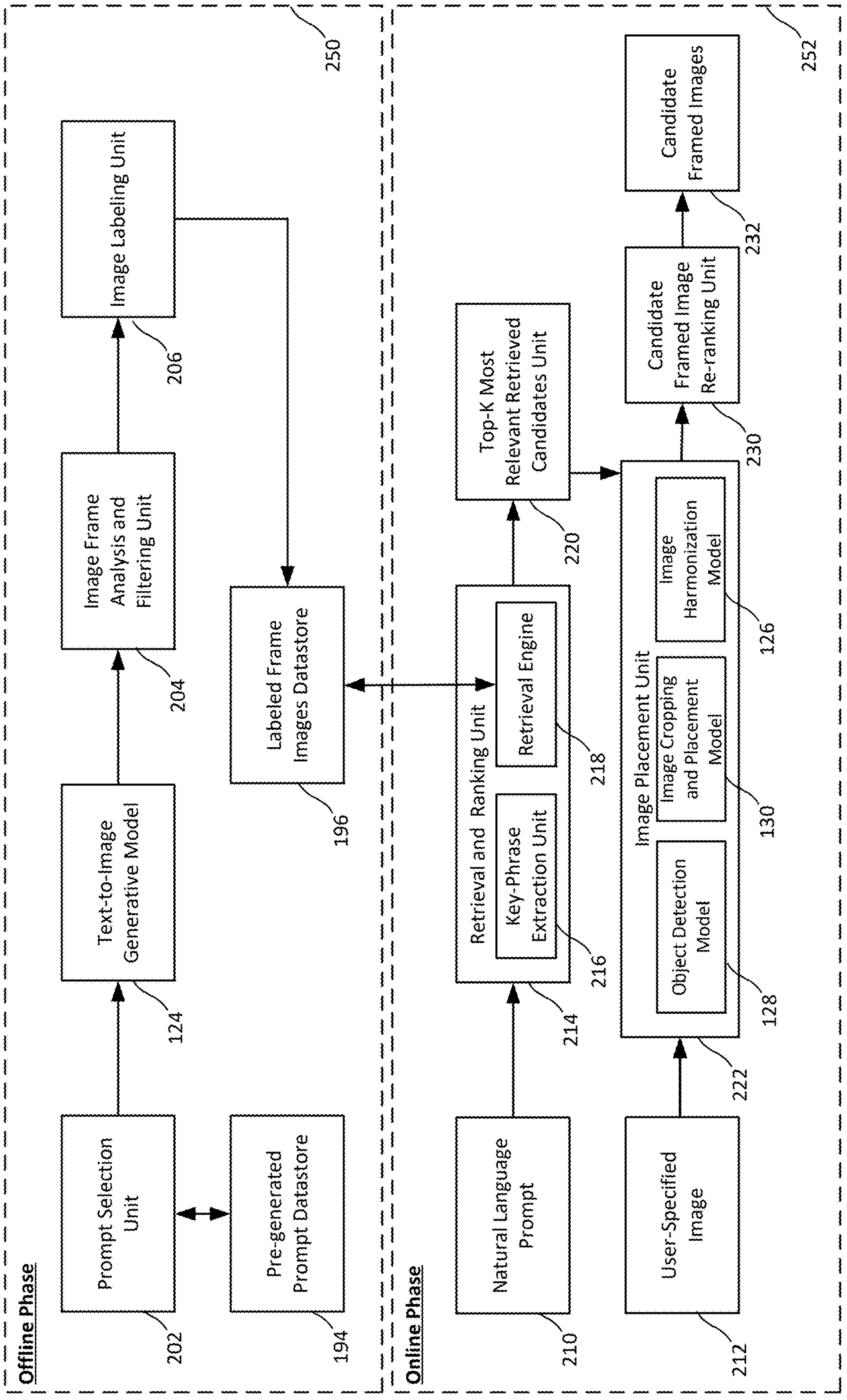
FIG. 2 is a diagram showing an example implementation of the frame generation and selection pipeline shown in FIG. 1.

FIG. 2 is a diagram showing an example implementation of the frame generation and selection pipeline 192 shown in FIG. 1. The example implementation of the frame generation and selection pipeline 192 includes an offline phase 250 and online phase 252. In the offline phase 250, the frame generation and selection pipeline 192 generates and labels the frame images in the labeled frame images datastore 196. In the online phase 252, the frame generation and selection pipeline 192 receives requests to generate one or more candidate framed photos for user-specified photos.

In the online phase 252, the prompt selection unit 202 selects pre-generated prompts from the pre-generated prompt datastore 194 and provides the pre-generated prompts as an input to the text-to-image generative language model 124. The text-to-image generative language model 124 generates a frame image for each of the pre-generated prompts. The pre-generated prompt datastore 194 includes set of natural language prompts have been constructed to cause the text-to-image generative language model 124 to generate one or more image frames that are associated with a specific topic or topics. Each topic can represent an occasion, holiday, a sporting event, a life event, a famous landmark, historical event, and/or other such topics for which user may wish to obtain a contextually relevant frame for a digital image. The frame images output by the text-to-image generative language model 124 are digital images that can be combined with user-specified images to create a framed image.

The frame images are provided as an input to the image frame analysis and filtering unit 204 to analyze the frame images to determine whether the frame images are relevant, do not contain potentially objectionable or offensive content, and do not contain anomalies. The image frame analysis and filtering unit 204 utilizes a model capable of analyzing images to analyze the frame images. As discussed in the preceding examples, the language model 122 is implemented using a GPT-V model or other language model that receive images as an input and a natural language prompt instructing the model to analyze the image and generate content based on the images. The image frame analysis and filtering unit 204 generates a request to the AI services 120 to analyze each of the image frames. The prompt construction layer 140 constructs a prompt for the language model 122 to cause the model to analyze each frame image to determine whether the frame is relevant based on the pre-generated prompt used to generate the frame image, whether the frame image includes potentially objectionable or offensive content, and whether the frame image includes any anomalies that would make the frame image in appropriate for use by the frame generation and selection pipeline 192. Generative models can inadvertently generate images that have such issues. Anomalies in the image frames may include but are not limited to distorted features, an incorrect number of features, and/or unintended text included in the features. The language model 122 outputs an indication whether an image frame includes anomalies and/or potentially objectionable or offensive content, and whether the image frame is relevant. The image frame analysis and filtering unit 204 discards any image frames that are not relevant or include anomalies and/or potentially objectionable or offensive content. Otherwise, the image frame analysis and filtering unit 204 provides the image frames as an input to the image labeling unit 206. A technical benefit of this approach is that the image frame analysis and filtering unit 204 can identify and eliminate image frames that would negatively impact the user experience from being presented to users.

In some implementations, the image frame analysis and filtering unit 204 provides the image frames to the moderation services 168 to determine whether the image frames include potentially objectionable or offensive content. As discussed in the preceding examples, the moderation services 168 analyzes the text and/or objects in the images using various machine learning models to determine whether to allow or reject the image frames. Any image frames that are rejected by the moderation services 168 may be flagged for review by an administrator along with the corresponding prompt used to generate the image. The administrator reviews the image frames, and their corresponding prompts, to ensure that the moderation services 168 correctly assessed that the image frames included potentially objectionable or offensive content. A technical benefit of this approach is that the administrator is alerted to potential problems in the content that was automatically generated by the text-to-image generative language model 124. The administrator may modify the prompts and/or take steps to further refine the training of the text-to-image generative language model 124.

The frame images that pass the filtering by the image frame analysis and filtering unit 204 are provided as an input to the image labeling unit 206. The image labeling unit 206 creates a label for each of the image frames based on the specific topic or topics represented by one or more key phrases included in the pre-generated language prompt used to generate the image. The text-to-image generative language model 124 may also generate multiple frame images based on a single pre-generated prompt, and the image labeling unit 206 associates the same label with each of the frame images generated using the pre-generated prompt. In some implementations, the image labeling unit 206 generates a label which maps to one or more key phrases in a multidimensional vector space using a transformer model. In some implementations, the image labeling unit 206 utilizes a model that is specifically used for generating these labels. In a non-limiting example, the image labeling unit utilizes the all-MiniLM-L12-v2 model by Hugging Face to generate the image labels. In other implementations, the language model 122 is used to generate embeddings based on the one or more key phrases that map these key phrases in a multidimensional vector space utilized by the language model 122. The image labeling unit 206 stores the labels and the frame images in the labeled frame images datastore 196.

In the online phase, a user inputs a natural language prompt 210 into the user interface of an application, such as the native application 114 or web application 190, requesting that the application services platform 110 generate a frame for a user-specified image 212. The user-specified image 212 may be a photograph, drawing, rendering, or other type of image that the user would like to place in an image frame. The natural language prompt 210 can describe a specific topic or set of topics for which the user would like the application services platform 110 to generate and/or select image frames. The natural language prompt 210 may also specify attributes of the image frame to be generated, such as specific elements that the user would like to include or exclude from the image frame, specific color schemes that the user would like to include or exclude from the image frame, and/or other such attributes of the image frame. The natural language prompt 210 input by the user is provided as an input to the retrieval and ranking unit 214, and the user-specified image 212 is provided as an input to the image placement unit 222.

The retrieval and ranking unit 214 analyzes the natural language prompt 210 and identifies candidate image frames from the labeled frame images datastore 196 that are predicted to satisfy the user requirements described in the natural language prompt 210. As discussed in the preceding examples, the natural language prompt 210 describes the topic for the image frame and/or the other attributes of the image frame to be incorporated with the user-specified image 212. The retrieval and ranking unit 214 includes a key-phrase extraction unit 216 that extracts one or more key phrases from the natural language prompt 210 that describe a topic of the image frame to be generated for the user-specified image 212. The retrieval and ranking unit 214 utilizes a language model that receives the natural language prompt 210 as an input, identifies the one or more key phrases in the natural language prompt 210, and outputs the one or more key phrases. In some implementations, the retrieval and ranking unit 214 relies on the language model 122 to analyze the natural language prompt 210. In such implementations, the retrieval and ranking unit 214 generates a request to the request processing unit 150 to provide the natural language prompt 210 to the AI services 120 for analysis. The request includes an indication that the AI services 120 is to analyze the natural language prompt 210 for one or more key phrases. The prompt construction layer 140 receives the request and selects a prompt template for the language model 122 to cause the language model 122 to analyze the natural language prompt 210 and output the one or more key phrases. In other implementations, the AI services 120 includes a separate language model (not shown) that is trained to analyze textual content, such as the natural language prompt 210, and output one or more key phrases detected therein.

The one or more key phrases are output by the key-phrase extraction unit 216 and provided as an input to the retrieval engine 218. The retrieval engine 218 analyzes the one or more key phrases and identifies a set of candidate frame images from among the plurality of frame images stored in the labeled frame images datastore 196. The retrieval engine 218 maps the one or more key phrases to a multidimensional vector space using a similar approach as that utilized by the image labeling unit 206. The retrieval engine 218 then performs a semantic search on the labeled frame images datastore 196 to identify a set of candidate image frames that are similar to the one or more key phrases extracted from the natural language prompt 210. The set of candidate image frames are then provided to the top-k most relevant retrieved candidates unit 220, which ranks the candidate image frames from most relevant to least relevant based on the similarity scores associated with each candidate image frame and outputs the top k most relevant candidate image frames. The value of k is a positive integer greater than zero. The value of k may be set to a predetermined default value by the application services platform 110. In some implementations, the value of k is configurable by a user in a user interface of the native application 114 and/or the web application 190. The top k candidate frame images are provided as an input to the image placement unit 222.

The image placement unit 222 receives the user-specified image 212 and the top k candidate frame images as an input. The user-specified image 212 is a digital image that the user provided with the natural language prompt 210 to have the application services platform 110 suggested one or more image frames for the user-specified image 212. The image placement unit 222 uses the object detection model 128, the image cropping and placement model 130, and the image harmonization model 126 to generate a set of candidate framed images. As discussed in the preceding examples, the image placement unit 130 provides each candidate image frame from the top k image frames to the object detection model 128 for analysis, and the object detection model 128 provides a bounding box or other bounding shape that indicates a shape of the space available in the frame image for placement of the user-specified image 212. The image placement unit 222 may also provide the user-specified image 212 to the object detection model 128 to detect one or more objects include in the user-specified image 212. This bounding box information can be used by the image cropping and placement model 130 should the user-specified image 212 need to be cropped. The image placement unit 222 uses the image cropping and placement model 130 to seamlessly integrate the user-specified image 212 with each of the image frames. The image placement unit 222 sends a request to the request processing unit 150 to submit the user-specified image 212, the bounding box or bounding shape information for the image frame, and optionally the bounding box or bounding shape information for the user-specified image 212. The request is routed to the AI services 120 and the image cropping and placement model 130 analyzes the inputs provided with the request and outputs a framed image. The framed image is provided as an input to the image harmonization model 126. The image harmonization model 126 analyzes the framed image to harmonize the lighting, colors, and/or other attributes of the user-specified image 212 and the image frame to provide a well-integrated and contextually relevant framed image. The image placement unit repeats this process for each of the top k candidate image frames and provides the set of framed images to the candidate framed image re-ranking unit 230. The candidate framed image re-ranking unit 230 analyzes and ranks the framed images that have been generated to order the framed images predicted to be most relevant first. The candidate framed image re-ranking unit 230 outputs the ranked framed images as candidate framed images 232. The candidate framed images 232 may then be presented to the user in a user interface of the native application 114 or the web application 190.

The candidate framed image re-ranking unit 230 provides a feedback mechanism for analyzing the candidate framed images. The candidate framed image re-ranking unit 230 utilizes the language model 122 to analyze the candidate frame images to determine whether the frame images are relevant, do not contain potentially objectionable or offensive content, and do not contain anomalies in a similar manner as the image frame analysis and filtering unit 204. However, the candidate framed image re-ranking unit 230 also requests that the language model 122 rank the remaining framed images based on relevance after eliminating those framed images that are determined to be irrelevant, contain potentially objectionable or offensive content, and/or contain anomalies. The relevance ranking is based on the natural language prompt 210. The candidate framed image re-ranking unit 230 sends a request to the AI services 120 to analyze each of the framed images to generate a relevance score based on the aesthetic appear and relevance to the natural language prompt 210, and the prompt construction unit 140 generates a prompt to the language model 122 to generate the relevance score for each of the images. The candidate framed image re-ranking unit 230 then ranks the framed images according to the relevance scores. The ranked frame images are presented to the presented to the user in a user interface of the native application 114 or the web application 190 according to this ranked order so that the user is presented with the most relevant framed image first.

Figure 3:
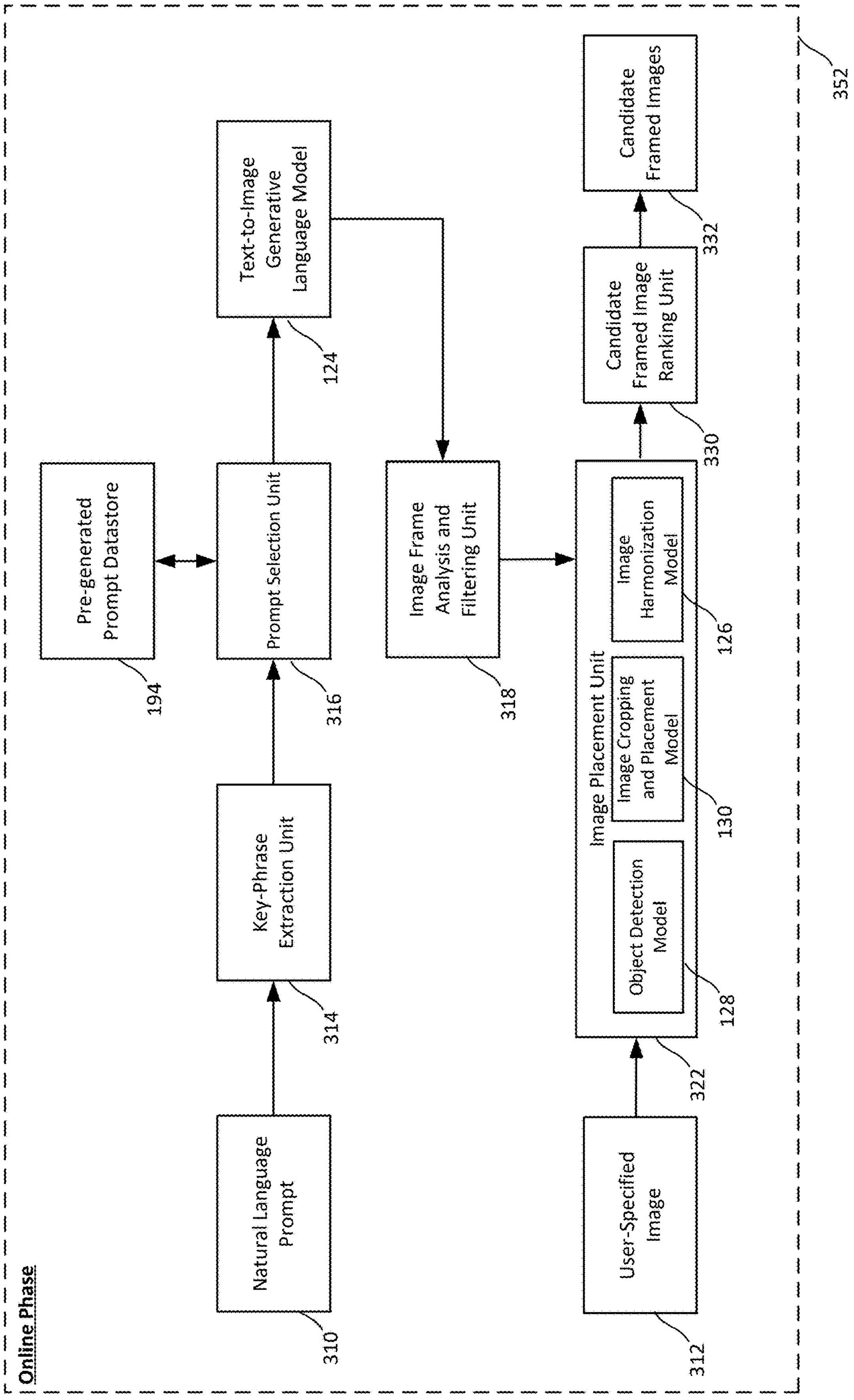
FIG. 3 is a diagram showing another example implementation of the frame generation and selection pipeline shown in FIG. 1.

FIG. 3 is a diagram showing another example implementation of the frame generation and selection pipeline 192 shown in FIG. 1. In the example implementation shown in FIG. 3, the frame generation and selection pipeline 192 only includes an online phase 352. In such implementations, the candidate image frames used to generate the candidate framed images are generated in response to the natural language prompt 310 rather than being selected from among pre-generated image frames stored in the labeled frame images datastore 196 as shown in FIG. 2. In some implementations, the retrieval and ranking unit 214 utilizes the implementation shown in FIG. 3 in response to the retrieval engine 218 determining that no relevant image frames or less than a threshold number of relevant images frames are available in the labeled frame images datastore 196. A technical benefit of this approach is that the frame generation and selection pipeline 192 can automatically adapt to situations in which a particular topic or topics are currently not supported and provide the user with the requested image frame for the user-specified image 312.

The natural language prompt 310 is similar to the natural language prompt 210 discussed with respect to FIG. 2. The natural language prompt 310 is provided to key-phrase extraction unit 314, which operates similarly to the key-phrase extraction unit 216 shown in FIG. 2. The key-phrase extraction unit 314 extracts one or more key phrases from the natural language prompt 310 that describe a topic of the image frame to be generated for the user-specified image 312. The one or more key phrases are then provided as an input to the prompt selection unit 316. The prompt selection unit 316 searches for a pre-generated prompt from the pre-generated prompt datastore 194 that is associated with the one or more key phrases. As discussed in the preceding examples, the pre-generated prompt datastore 194 includes set of natural language prompts that have been constructed to cause the text-to-image generative language model 124 to generate one or more image frames that are associated with a specific topic or topics. The prompt selection unit 316 submits the selected prompt to the text-to-image generative language model 124 to cause the model to generate one or more candidate image frames. The one or more candidate image frames output by the text-to-image generative language model 124 are provided to the image frame analysis and filtering unit 318 for analysis. The image frame analysis and filtering unit 318 operates similarly to the image frame analysis and filtering unit 204 shown in FIG. 2. The image frame analysis and filtering unit 318 provides the image frames that have not been filtered out by the frame analysis and filtering unit 318 as an input to the image placement unit 322.

The image placement unit 322 operates similarly to the image placement unit 222 shown in FIG. 2. The image placement unit 322 analyzes the user-specified image 312 which is similar to the user-specified image 212 shown in FIG. 2. The image placement unit 322 uses the object detection model 128, the image cropping and placement model 130, and the image harmonization model 126 to generate a set of candidate framed images. The candidate framed images are provided as an input to the candidate framed image ranking unit 330, which operates similarly to the candidate framed image re-ranking unit 230 shown in FIG. 2. The candidate framed image ranking unit 330 outputs the candidate framed images 332. The candidate framed images 332 may then be presented to the user in a user interface of the native application 114 or the web application 190.

Figure 4A:
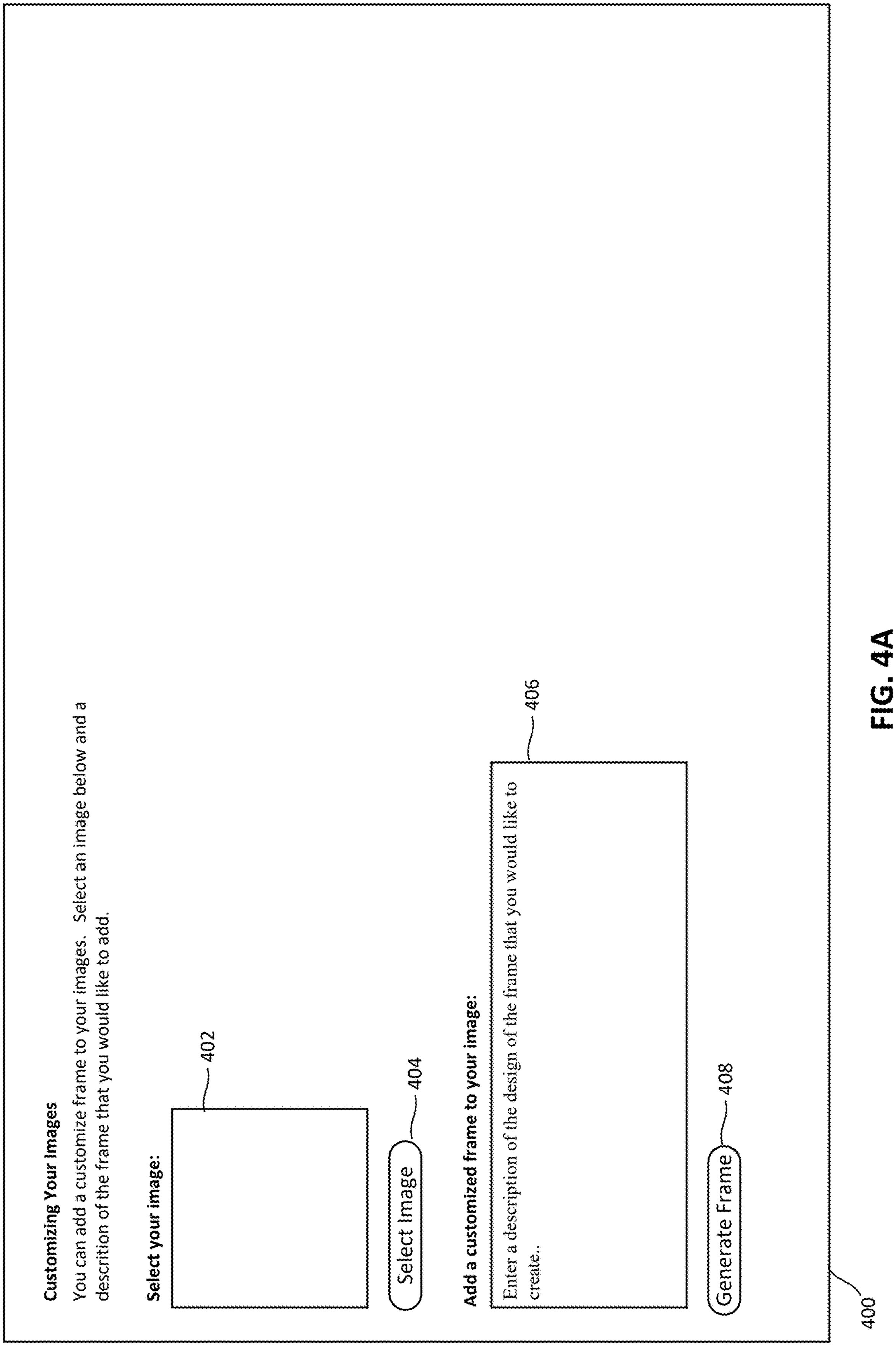
FIGS. 4A-4C are diagrams showing an example user interface of a design application according to the techniques disclosed herein.
Figure 4B:
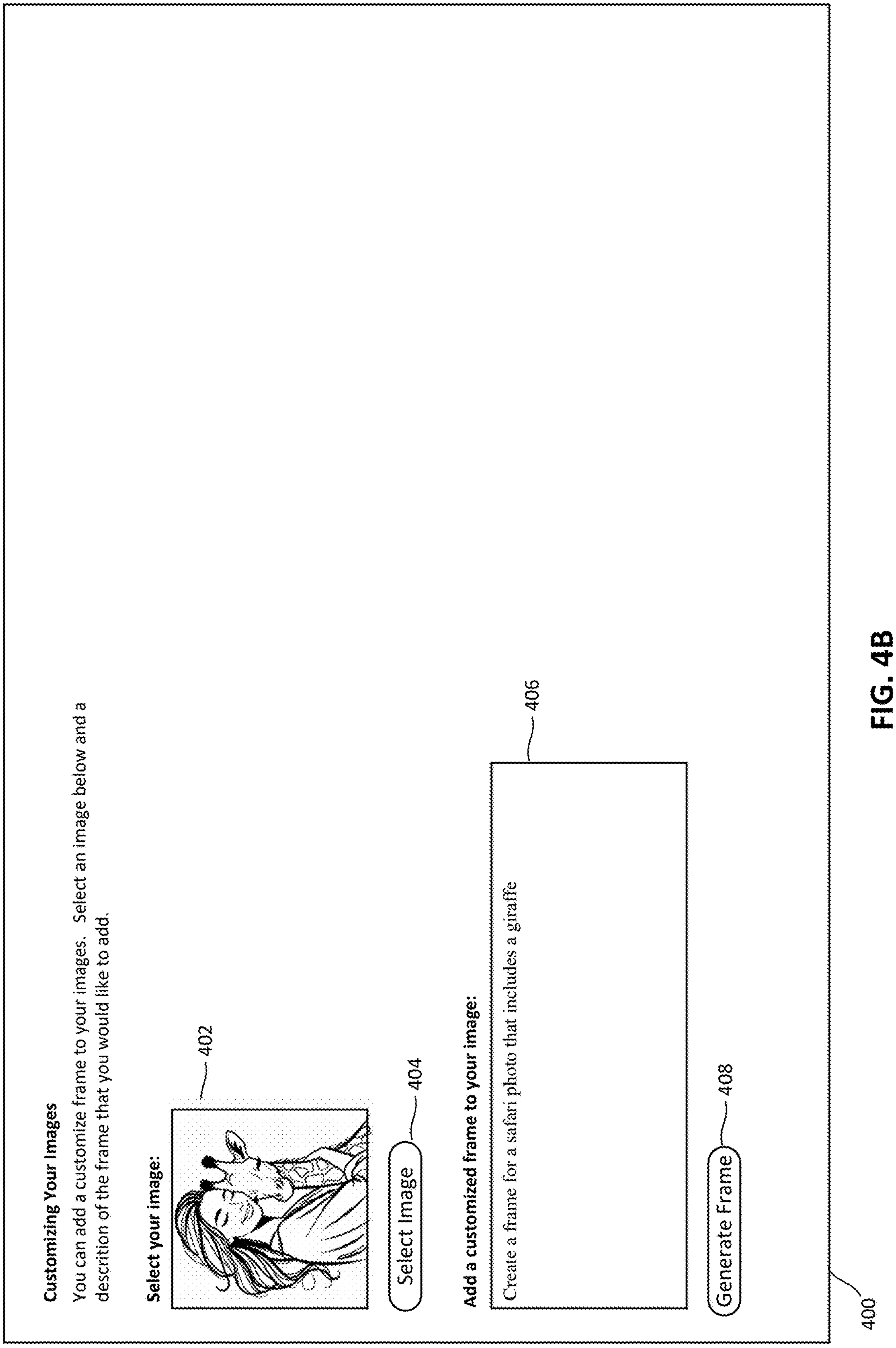
Figure 4C:
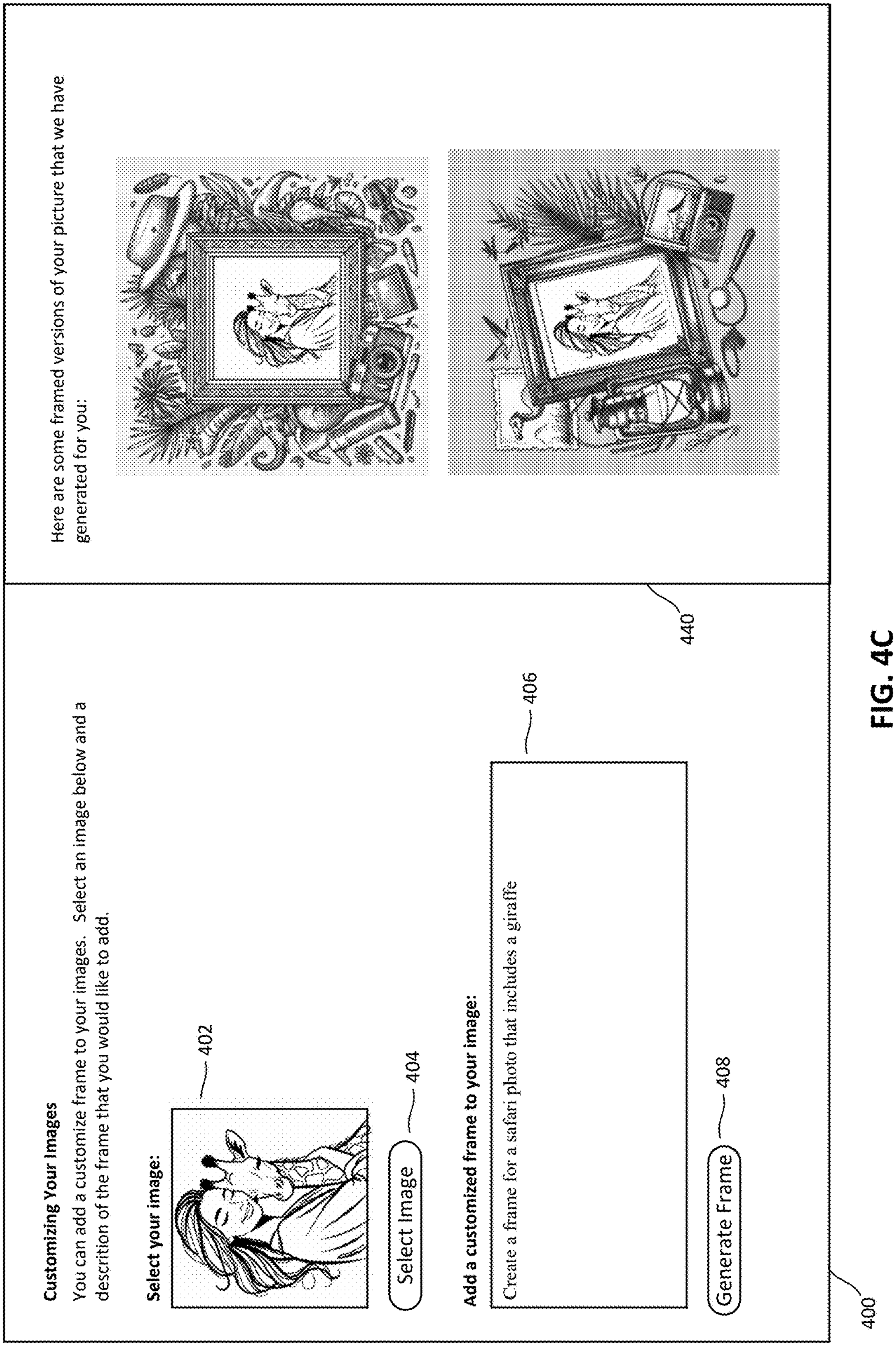

FIGS. 4A-4C are diagrams showing an example user interface 400 of a design application according to the techniques disclosed herein. The user interface 400 enables a user to customize an image, such as the user-specified image 212 or the user-specified image 312, with a context-sensitive frame. The user interface 400 can be implemented by the native application 114 of the client device or the web application 190 of the application services platform 110.

FIG. 4A shows an example of the user interface 400 which includes an image pane 402 which shows a user-specified image if one has been selected. The user interface 400 also includes a select image control 404, which when clicked on or otherwise activated, causes the user interface 400 to present a file selector interface that enables the user to select an image that is stored on the client device 105 and/or on the application services platform 110. The user interface 400 also includes a prompt field 406 in which the user can enter a natural language prompt that describes the topic for the frame and/or the other attributes of the image frame to be incorporated with the digital Image. The user can click on or otherwise activate the generate frame control 408 to cause the user interface 400 to invoke the native application 114 and/or the web application 190 to send a request to the request processing unit 150 for generating the image frame. The request processing unit 150 provides the request to the frame generation and selection pipeline 192 to obtain one or more candidate frame images to be presented to the user. FIG. 4B shows an example in which the user has selected a photo for which has frame is to be generated and entered a natural language prompt in the prompt field 406. FIG. 4C shows a results pane 440 that displays the candidate framed images generated by the frame generation and selection pipeline 192. The user may select one or more of the framed images to be included in content being created in the design application and/or save one or of the framed images for later use in the design application or another application. While the example implementation shown in FIG. 4C only shows two candidate images being presented to the user, other implementations may present a different number of candidate images to the user. Furthermore, the number of candidate images presented to the user may be configurable by the user in some implementations. FIG. 4C show an additional aspect of the invention in that the spaces for the user-specified image in the frame may be angled and the image cropping and placement model 130 is capable of detecting that the space for placing the user-specified image is angled and angles the user-specified image accordingly when placing the image in the image frame. Furthermore, some image frames include spaces for inserting more than one image in the image frame. In such implementations, the user selects more than one user-specified image as an input and the images are inserted into the spaces in the image frame. The user may specify an order for the images or the image cropping and placement model 130 may automatically select a placement for the images in the image frame. The image cropping and placement model 130 may also generate multiple framed images in such instance that include the user-specified images in different orders in the image frame.

Figure 5A:
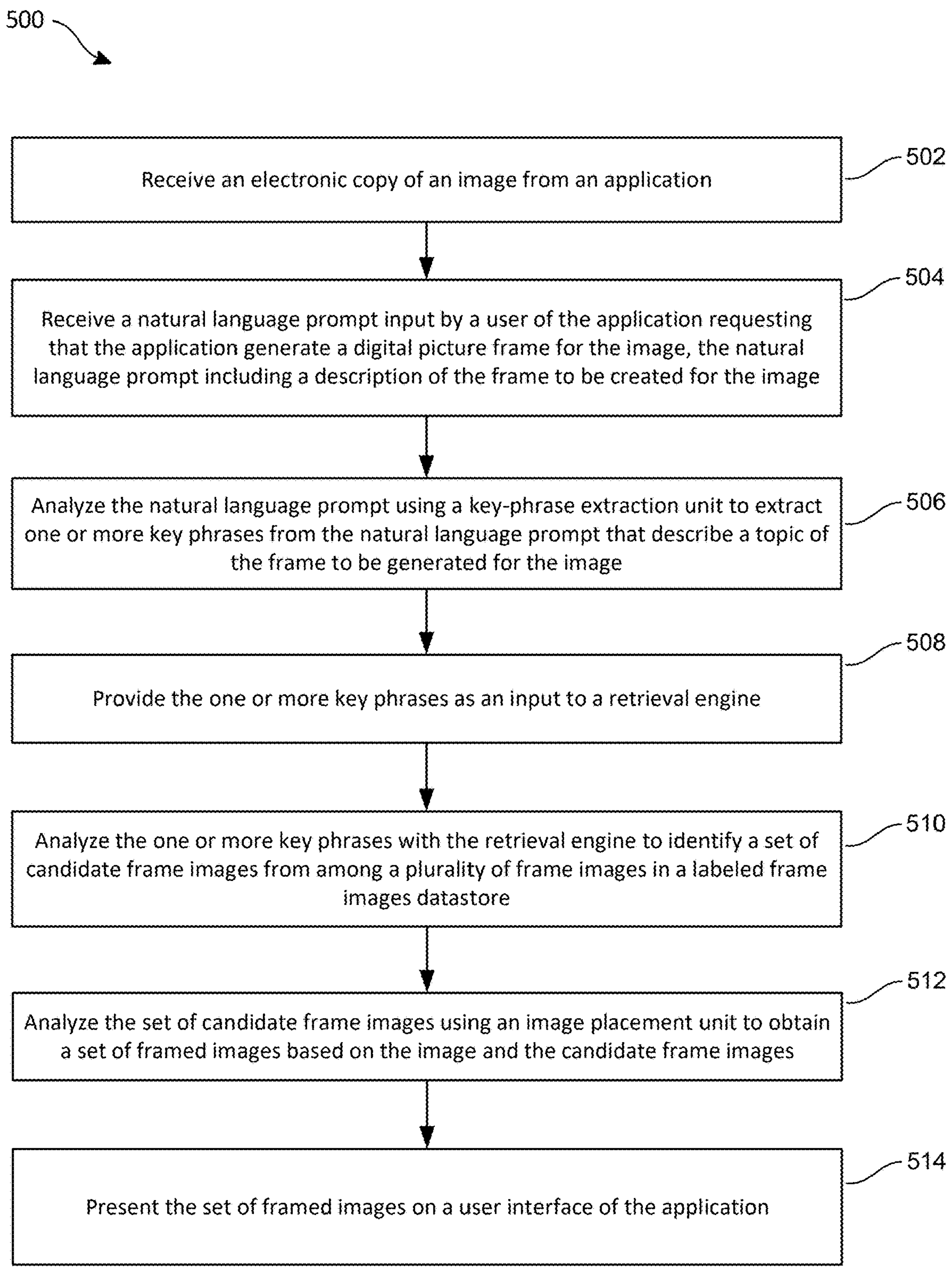
FIG. 5A is a flow chart of another example process for automatically obtaining a contextually relevant frame for an image according to the techniques disclosed herein.

FIG. 5A is a flow chart of another example process 500 for automatically obtaining a contextually relevant frame for an image according to the techniques disclosed herein. The process 500 can be implemented by the application services platform 110 as discussed in the preceding examples.

The process 500 includes an operation 502 of receiving an electronic copy of an image from an application and an operation 504 of receiving a natural language prompt input by a user of the application requesting that the application generate a digital picture frame for the image. The natural language prompt includes a description of the frame to be created for the image. As discussed in the preceding examples, the natural language prompt and one or more user-specified images may be provided by the user via the user interface 400 of the native application 114 or the web application 190. The request processing unit 150 receives the natural language prompt and/or the one or more sample images and provides these inputs to the frame generation and selection pipeline 192 for processing.

The process 500 includes an operation 506 of analyzing the natural language prompt 210 using a key-phrase extraction unit 216 to extract one or more key phrases from the natural language prompt 210 that describe a topic of the frame to be generated for the image.

The process 500 includes an operation 508 of providing the one or more key phrases as an input to a retrieval engine and an operation 510 of analyzing the one or more key phrases with the retrieval engine to identify a set of candidate frame images from among a plurality of frame images in a labeled frame images datastore 196.

The process 500 includes an operation 512 of analyzing the set of candidate frame images using an image placement unit 222 to obtain a set of framed images based on the image and the candidate frame images. The image placement unit 222 outputs a set of one or more framed images that may be ranked for relevance by the candidate frame image re-ranking unit 230 before being presented to the user.

The process 500 includes an operation 514 of presenting the set of framed images on a user interface of the application. As shown in FIG. 4C, the set of framed images can be presented to the user on the user interface 400 or other user interface of the native application 114 and/or the web application 190.

Figure 5B:
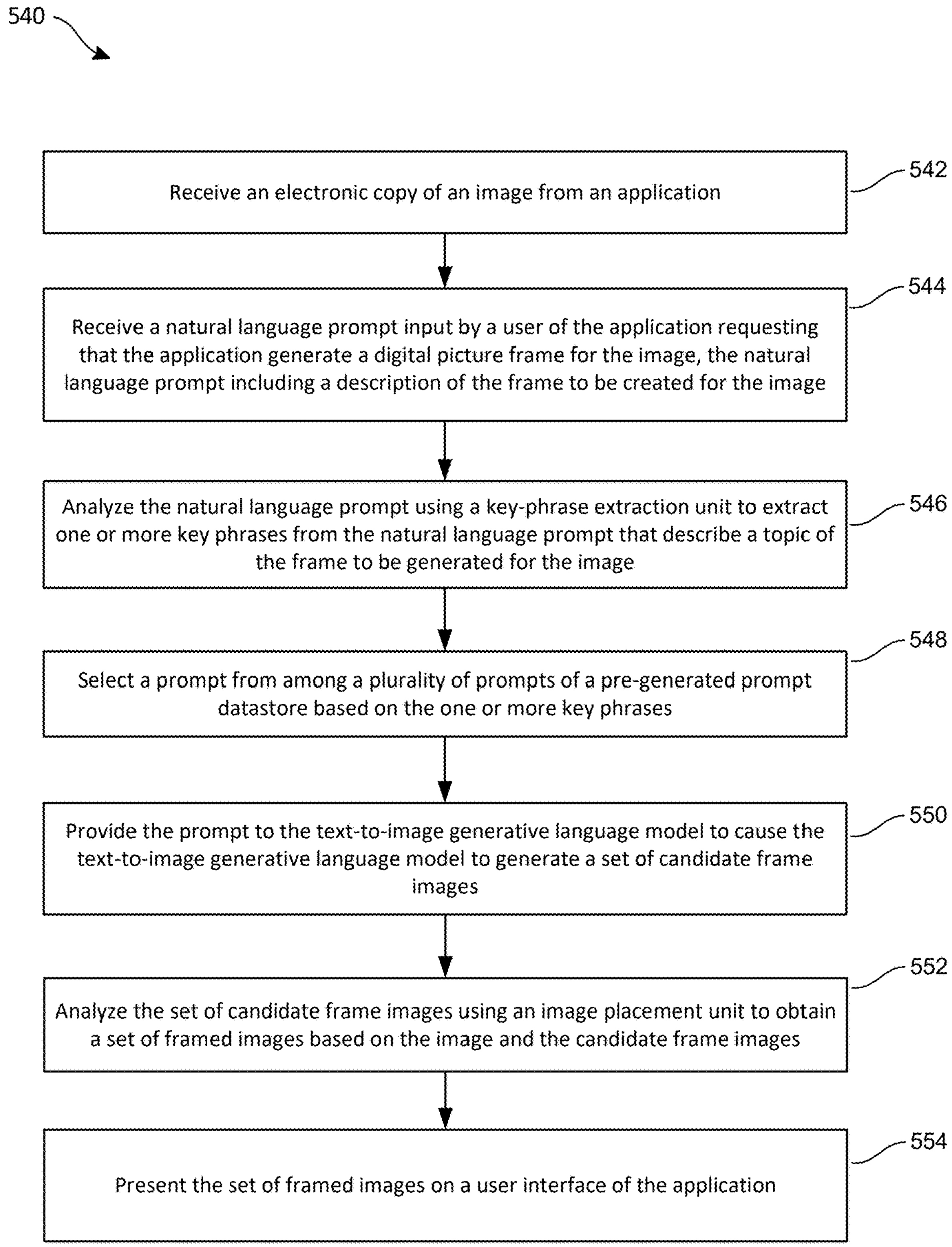
FIG. 5B is a flow chart of another example process for automatically obtaining a contextually relevant frame for an image according to the techniques disclosed herein.

FIG. 5B is a flow chart of another example process 540 for automatically obtaining a contextually relevant frame for an image according to the techniques disclosed herein. The process 540 can be implemented by the frame generation and selection pipeline 192 shown in FIG. 3.

The process 500 includes an operation 542 of receiving an electronic copy of an image from an application and an operation 544 of receiving a natural language prompt input by a user of the application requesting that the application generate a digital picture frame for the image. The natural language prompt includes a description of the frame to be created for the image. As discussed in the preceding examples, the natural language prompt and one or more user-specified images may be provided by the user via the user interface 400 of the native application 114 or the web application 190. The request processing unit 150 receives the natural language prompt and/or the one or more sample images and provides these inputs to the frame generation and selection pipeline 192 for processing.

The process 500 includes an operation 546 of analyzing the natural language prompt 310 using a key-phrase extraction unit 314 to extract one or more key phrases from the natural language prompt that describe a topic of the frame to be generated for the image. The key-phrase extraction unit 314 extracts the one or more key phrases from the natural language prompt 310 and provides the one or more key phrase as an input to the prompt selection unit 316.

The process 500 includes an operation 548 of selecting a prompt from among a plurality of prompts of a pre-generated prompt datastore based on the one or more key phrases and an operation 550 of providing the prompt to a text-to-image generative language model to cause the text-to-image generative language model to generate a set of candidate frame images. The prompt selection unit 316 selects the prompt from among the pre-generated prompts of the pre-generated prompt datastore 194 and provides the selected prompt to the text-to-image generative language model 124 as an input. The frame generation and selection pipeline 192 provides the prompt to the request processing unit 150, and the request processing unit 150 provides the prompt to the AI services 120 for execution by the text-to-image generative language model 124.

The process 500 includes an operation 552 of analyzing the set of candidate frame images using an image placement unit 322 to obtain a set of framed images based on the image and the candidate frame images. The image placement unit 322 outputs a set of one or more framed images that may be ranked for relevance by the candidate frame image ranking unit 330 before being presented to the user.

The process 500 includes an operation 554 of presenting the set of framed images on a user interface of the application. As shown in FIG. 4C, the set of framed images can be presented to the user on the user interface 400 or other user interface of the native application 114 and/or the web application 190.

The detailed examples of systems, devices, and techniques described in connection with FIGS. 1-5B are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-5B are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 6:
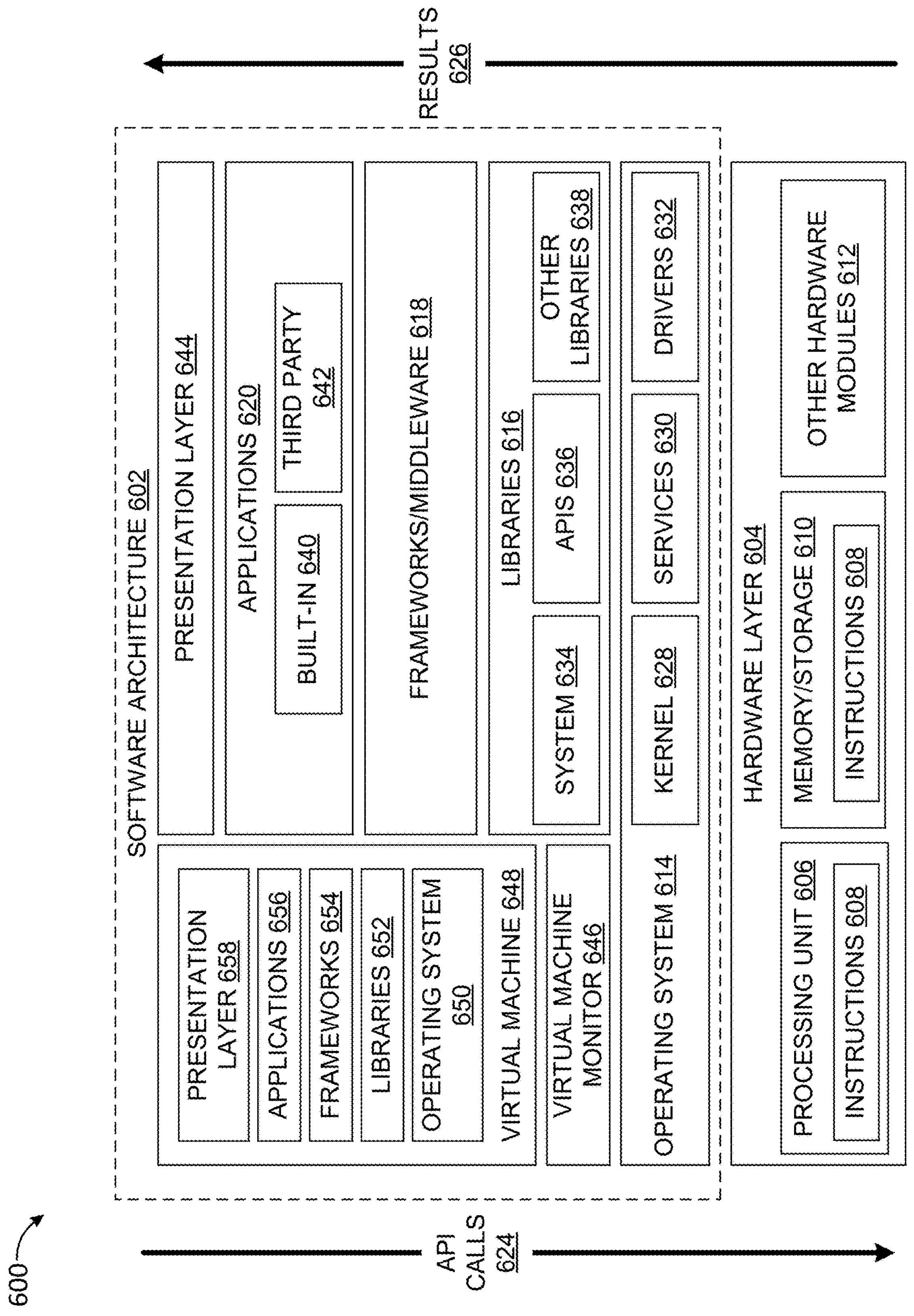
FIG. 6 is a block diagram showing an example software architecture, various portions of which may be used in conjunction with various hardware architectures herein described, which may implement any of the described features.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 includes a processing unit 606 and associated executable instructions 608. The executable instructions 608 represent executable instructions of the software architecture 602, including implementation of the methods, modules and so forth described herein. The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular platform. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
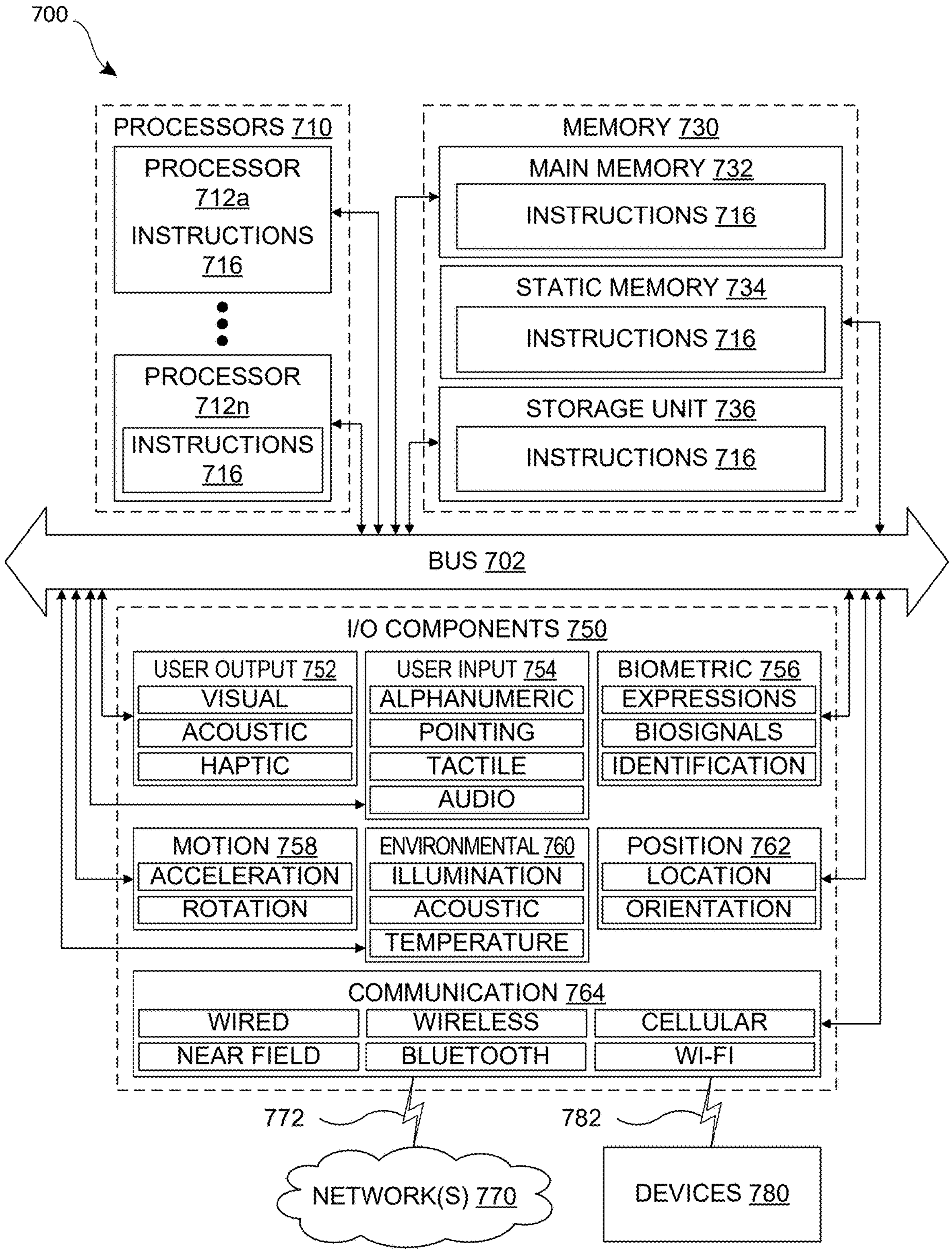
FIG. 7 is a block diagram showing components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement modules or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712*a* to 712*n* that may execute the instructions 716 and process data. In some examples, one or more processors 710 may execute instructions provided or identified by one or more other processors 710. The term "processor" includes a multicore processor including cores that may execute instructions contemporaneously. Although FIG. 7 shows multiple processors, the machine 700 may include a single processor with a single core, a single processor with multiple cores (for example, a multicore processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760, and/or position components 762, among a wide array of other physical sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 758 may include, for example, acceleration sensors (for example, an accelerometer) and rotation sensors (for example, a gyroscope). The environmental components 760 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 764, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article, or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:

a processor; and a memory storing executable instructions that, when executed, cause the processor alone or in combination with other processors to perform operations of:

constructing a labeled frame images datastore by:

obtaining a set of textual prompts from a pre-generated prompt datastore;

providing each prompt of the set of textual prompts to a text-to-image generative language model to cause the text-to-image generative language model to generate a frame image of a plurality of frame images;

generating a label for each frame image of the plurality of frame images using an image labeling unit, the label associating the frame image with one or more topics; and storing each frame image and the label associated with the frame image in the labeled frame images datastore;

receiving an electronic copy of an image from an application;

receiving a natural language prompt that was input by a user of the application requesting that the application generate a digital picture frame for the image, the natural language prompt including a description of the digital picture frame to be created for the image;

analyzing the natural language prompt using a key-phrase extraction unit to extract one or more key phrases from the natural language prompt that describe a topic of the digital picture frame to be generated for the image;

providing the one or more key phrases as an input to a retrieval engine;

analyzing the one or more key phrases with the retrieval engine to identify a set of candidate frame images from among a plurality of frame images in the labeled frame images datastore;

analyzing the set of candidate frame images using an image placement unit to obtain a set of framed images based on the image and the set of candidate frame images; and presenting the set of framed images on a user interface of the application.

2. The data processing system of claim 1, wherein analyzing the set of candidate frame images using the image placement unit to obtain the set of framed images further comprises:

analyzing the image using an object detection model to detect one or more objects in the image and to output object information for the one or more objects; and placing the image in each candidate frame image of the set of candidate frame images using an image cropping model, the image cropping model being trained to analyze the object information and each candidate frame image to crop the image to fit in each candidate frame image and output a candidate framed image.

3. The data processing system of claim 2, wherein the memory further includes instructions configured to cause the processor alone or in combination with other processors to perform operations of:

analyzing each framed image of the set of framed images using an image harmonization model trained to adjust attributes of each candidate frame image to harmonize an appearance of the image and an appearance of each candidate frame image included in each framed image.

4. The data processing system of claim 1, wherein retrieval engine determines a similarity score for each candidate frame image of the set of candidate frame images, and wherein the memory further includes instructions configured to cause the processor alone or in combination with other processors to perform and operation of ranking the set of candidate frame images based on the similarity score.

5. The data processing system of claim 4, wherein the retrieval engine determines the similarity score by performing operations of:

mapping the one or more key phrases to a multidimensional vector space using a transformer model to generate an encoded representation of the one or more key phrases; and comparing the encoded representation of the one or more key phrases with encoded representations of labels associated with each of the plurality of frame images to determine the similarity score for each candidate frame image of the set of candidate frame images.

6. The data processing system of claim 1, wherein generating the label for each frame image of the plurality of frame images using the image labeling unit further comprises:

mapping the one or more key phrases to a multidimensional vector space using a transformer model to generate an encoded representation of one or more topics associated with the frame image.

7. The data processing system of claim 1, wherein the memory further includes instructions configured to cause the processor alone or in combination with other processors to perform operations of:

analyzing each frame image of the plurality of frame images using a moderation service; and discarding one or more frame images in response to the moderation service determining that the one or more frame images include potentially offensive content.

8. The data processing system of claim 1, wherein the memory further includes instructions configured to cause the processor alone or in combination with other processors to perform operations of:

determining that the retrieval engine did not identify any candidate frame images from among the plurality of frame images;

generating one or more new frame images using a text-to-image model; and including the one or more new frame images in the set of candidate frame images.

9. The data processing system of claim 8, wherein generating the one or more new frame images using the text-to-image model further comprises:

selecting a prompt from among a plurality of prompts of a pre-generated prompt datastore based on the one or more key phrases; and providing the prompt to the text-to-image generative language model to cause the text-to-image generative language model to generate the one or more new frame images.

10. The data processing system of claim 9, wherein the memory further includes instructions configured to cause the processor alone or in combination with other processors to perform operations of:

analyzing each frame image of the one or more new frame images using a moderation service; and discarding a respective frame image of the one or more new frame images responsive to the moderation service determining that the respective frame image includes potentially offensive content.

11. The data processing system of claim 9, wherein the text-to-image generative language model is a large language model (LLM).

12. A data processing system comprising:

a processor; and a memory storing executable instructions that, when executed, cause the processor alone or in combination with other processors to perform operations of:

constructing a labeled frame images datastore by:

obtaining a set of textual prompts from a pre-generated prompt datastore;

providing each prompt of the set of textual prompts to a text-to-image generative language model to cause the text-to-image generative language model to generate a frame image of a plurality of frame images;

generating a label for each frame image of the plurality of frame images using an image labeling unit, the label associating the frame image with one or more topics; and storing each frame image and the label associated with the frame image in a labeled frame image datastore;

receiving an electronic copy of an image from an application;

receiving a natural language prompt that was input by a user of the application requesting that the application generate a digital picture frame for the image, the natural language prompt including a description of the digital picture frame to be created for the image;

analyzing the natural language prompt using a key-phrase extraction unit to extract one or more key phrases from the natural language prompt that describe a topic of the digital picture frame to be generated for the image;

analyzing the one or more key phrases with a retrieval engine to identify a set of candidate frame images from among a plurality of frame images in the labeled frame images datastore, the set of candidate frame images comprising a number of framed images equal to the number of framed images indicated in the natural language prompt;

analyzing the set of candidate frame images using an image placement unit to obtain a set of framed images based on the image and the set of candidate frame images; and presenting the set of framed images on a user interface of the application.

13. The data processing system of claim 12, wherein analyzing the set of candidate frame images using the image placement unit to obtain the set of framed images further comprises:

analyzing the image using an object detection model to detect one or more objects in the image and to output object information for the one or more objects; and placing the image in each candidate frame image of the set of candidate frame images using an image cropping model, the image cropping model being trained to analyze the object information and each candidate frame image to crop the image to fit in each candidate frame image and output a candidate framed image.

14. The data processing system of claim 13, wherein the object information comprises a bounding box surrounding the one or more objects in the image, and wherein the image cropping model uses the bounding box to determine whether to crop the image, each candidate frame image, or both.

15. The data processing system of claim 13, wherein the memory further includes instructions configured to cause the processor alone or in combination with other processors to perform operations of:

analyzing each framed image of the set of framed images using an image harmonization model trained to adjust attributes of each candidate frame image to harmonize an appearance of the image and an appearance of each candidate frame image included in each framed image.

16. The data processing system of claim 12, wherein the memory further includes instructions configured to cause the processor alone or in combination with other processors to perform operations of:

analyzing each candidate frame image of the set of candidate frame images using a moderation service; and discarding each candidate frame image of the set of candidate frame images responsive to the moderation service determining that each candidate frame image includes potentially offensive content.

17. The data processing system of claim 12, wherein the key-phrase extraction unit is implemented using a large language model (LLM), and wherein the text-to-image generative language model is a large language model (LLM).

18. A method implemented in a data processing system for a contextually relevant digital picture frame for an image, the method comprising:

constructing a labeled frame images datastore by:

obtaining a set of textual prompts from a pre-generated prompt datastore;

providing each prompt of the set of textual prompts to a text-to-image generative language model to cause the text-to-image generative language model to generate a frame image of a plurality of frame images;

generating a label for each frame image of the plurality of frame images using an image labeling unit, the label associating the frame image with one or more topics; and storing each frame image and the label associated with the frame image in a labeled frame image datastore;

receiving an electronic copy of an image from an application;

receiving a natural language prompt that was input by a user of the application requesting that the application generate a digital picture frame for the image, the natural language prompt including a description of the digital picture frame to be created for the image;

analyzing the natural language prompt using a key-phrase extraction unit to extract one or more key phrases from the natural language prompt that describe a topic of the digital picture frame to be generated for the image;

providing the one or more key phrases as an input to a retrieval engine;

analyzing the one or more key phrases with the retrieval engine to identify a set of candidate frame images from among a plurality of frame images in the labeled frame images datastore;

analyzing the set of candidate frame images using an image placement unit to obtain a set of framed images based on the image and the set of candidate frame images; and presenting the set of framed images on a user interface of the application.

19. The method of claim 18, wherein analyzing the set of candidate frame images using the image placement unit to obtain the set of framed images further comprises:

analyzing the image using an object detection model to detect one or more objects in the image and to output object information for the one or more objects; and placing the image in each candidate frame image of the set of candidate frame images using an image cropping model, the image cropping model being trained to analyze the object information and each candidate frame image to crop the image to fit in each candidate frame image and output a candidate framed image.

* * * * *